United States Patent
Holbourn

(10) Patent No.: US 10,422,855 B2
(45) Date of Patent: Sep. 24, 2019

(54) RADAR SYSTEMS AND METHODS

(71) Applicant: Leonardo MW Ltd, Basildon (GB)

(72) Inventor: Paul Edwin Holbourn, Basildon (GB)

(73) Assignee: LEONARD MW LTD, Basildon (GB)

(*) Notice: Subject to any disclaimer, the term of this patent is extended or adjusted under 35 U.S.C. 154(b) by 255 days.

(21) Appl. No.: 14/782,178

(22) PCT Filed: Apr. 3, 2014

(86) PCT No.: PCT/EP2014/056732
§ 371 (c)(1),
(2) Date: Oct. 2, 2015

(87) PCT Pub. No.: WO2014/161957
PCT Pub. Date: Oct. 9, 2014

(65) Prior Publication Data
US 2016/0041257 A1   Feb. 11, 2016

(30) Foreign Application Priority Data

Apr. 3, 2013 (GB) .................... 1306030.6

(51) Int. Cl.
*G01S 7/28* (2006.01)
*G01S 7/292* (2006.01)
*G01S 13/53* (2006.01)

(52) U.S. Cl.
CPC .......... *G01S 7/2813* (2013.01); *G01S 7/2925* (2013.01); *G01S 13/53* (2013.01)

(58) Field of Classification Search
CPC ........ G01S 7/34; G01S 7/2813; G01S 7/2925; G01S 7/2927; G01S 7/2928; G01S 13/53; G01S 13/5244; G01S 13/5246; G01S 13/762; G01S 13/90; G01S 13/9035
See application file for complete search history.

(56) References Cited

U.S. PATENT DOCUMENTS

| | | | | |
|---|---|---|---|---|
| 3,202,990 A | * | 8/1965 | Howells | G01S 7/2813 342/381 |
| 3,623,094 A | * | 11/1971 | Paine | H01Q 19/19 342/153 |
| 4,023,172 A | * | 5/1977 | Schmidt | G01S 3/32 342/149 |

(Continued)

FOREIGN PATENT DOCUMENTS

| | | |
|---|---|---|
| EP | 1 316 816 A3 | 6/2003 |
| WO | WO 2007/057707 A1 | 5/2007 |

OTHER PUBLICATIONS

International Search Report (PCT/ISA/210) dated Aug. 1, 2014, by the European Patent Office as the International Searching Authority for International Application No. PCT/EP2014/056732.

(Continued)

*Primary Examiner* — Bernarr E Gregory
*Assistant Examiner* — Daniel P Malley, Sr.
(74) *Attorney, Agent, or Firm* — Buchanan Ingersoll & Rooney PC

(57) ABSTRACT

A radar system having side lobe blanking capability is disclosed. The system can include a single channel antenna and receiver system, the side lobe blanking system being time multiplexed, but requiring no dedicated guard channel data collection period such that the scan rate of the system is not degraded.

1 Claim, 1 Drawing Sheet

(56) References Cited

U.S. PATENT DOCUMENTS

Figure 1:
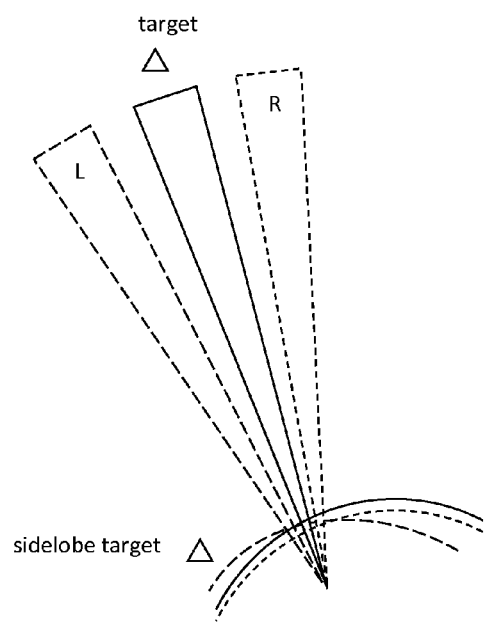

| | | | | |
|---|---|---|---|---|
| 4,088,997 | A | * | 5/1978 | Winderman ........ G01S 13/4436 342/150 |
| 4,377,811 | A | * | 3/1983 | Mooney, Jr. ............ G01S 13/53 342/145 |
| 4,596,986 | A | * | 6/1986 | Andrews ............... G01S 7/2813 342/373 |
| 4,646,094 | A | * | 2/1987 | Stevenson ............. G01S 7/2813 342/155 |
| 4,959,653 | A | * | 9/1990 | Ganz ....................... G01S 7/021 342/17 |
| 5,739,788 | A | * | 4/1998 | Dybdal .................... H01Q 3/10 342/16 |
| 5,907,302 | A | * | 5/1999 | Melvin, Jr. ......... G01S 13/5244 342/140 |
| 5,926,128 | A | * | 7/1999 | Brash ...................... G01S 3/325 342/149 |
| 6,150,976 | A | * | 11/2000 | Cooley ................ G01S 7/4052 342/165 |
| 2008/0068266 | A1 | | 3/2008 | DeAgro |
| 2009/0051587 | A1 | * | 2/2009 | Lancashire ........... G01S 7/2926 342/25 F |
| 2010/0283664 | A1 | * | 11/2010 | Weber ....................... G01S 3/32 342/159 |

OTHER PUBLICATIONS

Written Opinion (PCT/ISA/237) dated Aug. 1, 2014, by the European Patent Office as the International Searching Authority for International Application No. PCT/EP2014/056732.

\* cited by examiner

RADAR SYSTEMS AND METHODS

The invention relates to radar systems and methods. More specifically but not exclusively it relates to a radar system employing Side Lobe Blanking (SLB) and associated signal processing.

In many radar applications strong signals may enter a radar receiver through antenna side lobes and as such may be interpreted as main beam signals. This results in false detections and angle errors. Side lobe blanking (SLB) provides an effective way to suppress such signals when they are impulsive (such as low duty ratio signals) whether they are due to side lobe jammers, large radar cross-section (RCS) targets or discrete clutter returns. The principle of SLB is to inhibit the detection when such signals appear in the radar side lobes. Airborne radar systems for air target surveillance and track which employ Medium Pulse Repetition Frequency (MPRF) waveforms, which are ambiguous in range and Doppler, are particularly susceptible to side lobe interference, and, therefore, generally employ a SLB system to mitigate the effects.

The usual implementation of SLB uses two discrete antenna and receiver channels, namely the main (sum), $\Sigma$ and auxiliary (Guard), G, channel. The G channel antenna gain is designed to be generally higher than the side lobe levels of the $\Sigma$ channel antenna pattern. A typical processing sequence then compares each active $\Sigma$ range—Doppler cell, (i.e. a $\Sigma$ cell which contains a candidate detection determined by adaptive thresholding) with the signal level in the corresponding range—Doppler G channel. The SLB logic decides whether or not to blank $\Sigma$ channel cells on the basis of whether or not the $\Sigma$ channel signal exceeds a threshold set by the G channel signal, commonly a $\Sigma/G$ ratio test. When this test is passed, the candidate $\Sigma$ detection is then subject to further signal processing, otherwise this detection is inhibited and blanked.

Whilst this system is effective, it does require significant hardware investment, for example, a G antenna, a dedicated G receiver and significant signal processing as the G channel mirrors the $\Sigma$ channel scheme up to the point where the channels are combined; for example the processing scheme may use pulse compression, time domain filtering, Doppler filtering, and adaptive thresholding (local 2-D area average) algorithms, plus many others.

An alternative system implementation is envisaged that overcomes the disadvantages of the typical system described above.

According to the invention there is provided a radar system having a side lobe blanking capability comprising a single channel antenna and receiver system, said side lobe blanking system employing a guard antenna pattern synthesised from data derived from the single radar channel data in a time multiplexed fashion which does not degrade the scan rate or sensitivity of the system.

The present invention therefore proposes a single channel processing scheme, incorporating SLB, which requires no dedicated G channel hardware.

According to the invention there is further provided a method of eliminating radar signals detected on a radar receiver through antenna side lobes comprising the steps of: receiving a first set of data for a first channel; displacing the azimuth of detection of the radar receiver by a positive and negative predetermined amount; receiving two sets of data corresponding to the positively and negatively displaced azimuth position of the antenna receiver; combining said two sets of data to form a combined data set; and comparing the combined data set with the first set of data thereby eliminating the impact of range gate migration and time decorrelation of side lobe discretes.

One form of the invention, to be described in more detail below, preferably employs a time multiplexed G channel, switching on receive between the usual $\Sigma$ pattern and a separate G pattern on a coherent burst-to-coherent burst basis. The G channel in this form of the invention may be a separate antenna or may comprise a sub-array of the $\Sigma$ antenna. In either case, the aim is to provide a G antenna pattern to provide adequate G—$\Sigma$ margin for false alarm regulation. This scheme requires however a dedicated data collection period for the G channel, and is thus sub-optimum in terms of energy efficiency and may lead to a degradation in the scan rate from the optimum.

Preferably, the present invention is based on a new concept which may be termed 'Self Guard' which is energy efficient and preserves the desired scan rate. This concept exploits the fact that the 'detection' of a side lobe discrete and its measurement of range and Doppler is relatively independent of the $\Sigma$ pattern boresight position, whilst a typical air target can only be detected if it lies within the $\Sigma$ pattern main beam. Thus for a particular boresight position, the detection list extracted from the sum pattern data can be combined with G channel detection data synthesised from $\Sigma$ pattern detection data for different boresight positions in such a way as to blank detection of side lobe discretes for the current boresight position of interest. This G channel detection data is derived from $\Sigma$ channel data measured at a different boresight position within the search pattern at slightly earlier or later opportunities.

In this way, a system in accordance with the invention implements side lobe blanking of impulsive interference whilst eliminating the cost, and hardware and software burden of implementing a physically separate auxiliary antenna, receiver and signal processing associated with a dedicated guard channel. The system is also energy efficient as it avoids the time-multiplexing associated with a separate G antenna.

The invention will now be described with reference to the accompanying diagrammatic drawings in which:

FIG. 1 is a schematic drawing of the operation of the system. It can be seen that the target is only detected when the antenna beam is in the central position, whereas the sidelobe target is detected in all three antenna positions. By using data from the left hand (L) and right hand (R) beam positions the sidelobe detection can be eliminated when the beam is in the central position.

Figure 2:
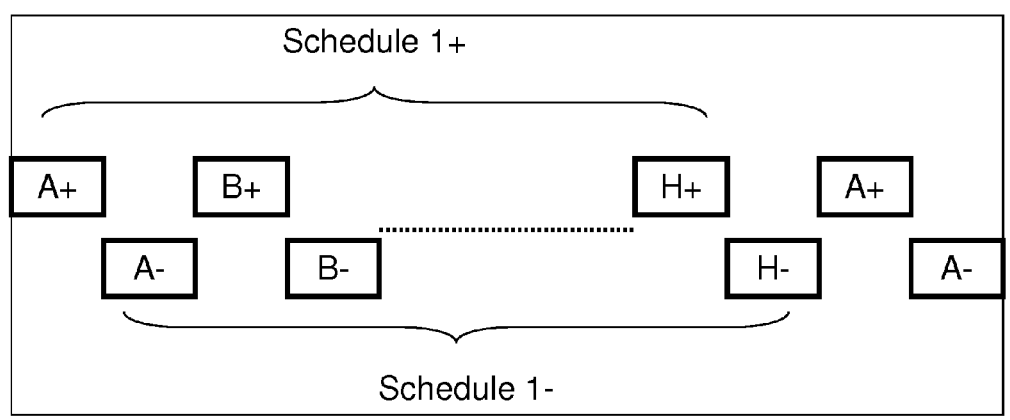

FIG. 2 is a schematic drawing showing independent sliding window M/N and azimuth centroiding processes that are used to resolve the ambiguities and estimate azimuth position for the left hand $\Sigma$ (+) and right hand $\Sigma$ (−) sequence of schedules.

In a system in accordance with one form of the invention, discussed above with reference to FIG. 1, $\Sigma$ channel data for a boresight of interest is compared with two sets of $\Sigma$ channel data acting as 'G' channels, displaced in azimuth by, for example, ~+/−10 degrees from the boresight position. Detection lists from the two 'G' channels are then combined (OR-ed) together before being used to blank $\Sigma$ channel detections. After SLB, range and Doppler ambiguities are removed by typical signal processing means that are well-known in the art. Further control of side lobe discretes can be exercised through intelligent application of range-variable thresholds once the absolute range has been established.

Note that the $\Sigma$ channel data may be processed in different ways depending on whether it is to be used for $\Sigma$ channel or 'G' channel purposes, for example it may be advantageous to employ lower thresholds for the 'G' channel.

Two 'G' channels are proposed to improve the G-Σ ratio and exploit the fact that near-in side lobe levels are higher than far-out side lobe levels. Thus for a given position of side lobe discrete, with respect to the Σ channel boresight, there is likely to be a positive G-Σ ratio for one or other of the two 'G' patterns.

It will be appreciated that separating the two 'G' patterns' by, for example, 20 degrees, will require a large number of coherent bursts of data to be held in memory. However this is unlikely to be an issue for modern digital processing systems.

It will be appreciated that a number of considerations arise from this processing scheme as a result of data latency. For example, fixed frequency operation is assumed so that side lobe discretes do not become spatially decorrelated or migrate in Doppler bin number. Furthermore, as the data collected will effectively come from a 20 degree window, which corresponds to ~0.33 second at 60 degree/sec scan rate, some consideration needs to be given to range—Doppler migration over the period, which is not inconsiderable. For example, at 240 m/s target velocity, range migration lies within a −80 m to +80 m window for 360 degree scan excluding any effect of own ship motion.

Moreover, large side lobe discretes can exhibit very angle-dependent patterns, with 'main beam' RCS lobes typically extending over only ~1-2 milliradians. Over a period of 0.3 seconds or so there is a possibility of decorrelation as a result of own ship motion, particularly for short range discretes.

Preferably, in another form of the invention, the challenge of range migration and time decorrelation can be overcome by exploiting the capabilities of an electronically scanned antenna.

In this form of the invention the Σ and its associated 'G' channel is acquired on a burst by burst time multiplexed basis and synchronised with 'electronic' azimuth beam steps. Thus the equivalent time interval over which Σ and its associated 'G' data is obtained is now reduced to 2 bursts, effectively eliminating range migration and very significantly reducing the opportunity for decorrelation. This data pair effectively provides data simultaneously for two Σ beam patterns separated in angle, and for each Σ pattern the associated 'G' data is derived from the other Σ pattern of the data pair, e.g. the left hand Σ pattern is associated with the right Σ pattern acting as a G channel, whilst the right hand Σ pattern is associated with the left Σ hand pattern acting as a G channel.

Preferably, the following points should also be considered.

Firstly, the Σ antenna pattern at, say, ~+/−10 degree electronic squint angle will have higher side lobes than when pointing at 0 degrees. This may be undesirable when a 0 degree Σ pattern is acting as 'G' for a +/−10 degree squint Σ pattern. However, this effect may be reduced by avoiding the boresight position, and setting the Σ and 'G' position at, say, ~+/−5 degrees respectively.

Secondly, it may be desirable to position the Σ and 'G' channels asymmetrically around the boresight pattern to ensure optimal coverage of the Σ side lobes by the 'G' channel.

Finally, the scan rate, Σ beam width, schedule period, and angular position of the 'G' beam patterns are tightly connected. Nominally the scan rate will be chosen to ensure that the time on target (2-way Σ beam width/scan rate) is approximately equal to or slightly greater than the schedule period (the schedule comprising typically 8 bursts, each one at a unique PRF).

The invention claimed is:

1. A method of blanking radar signals, the method comprising:
   displacing the azimuth position of a radar receiver according to a scan pattern through a plurality of bore sight positions and receiving at each of the plurality of bore sight positions a set of Σ channel data;
   for a first bore sight position of the plurality of bore sight positions:
   combining two Σ channel data sets taken at two bore sight positions of the plurality of different bore sight positions different from the first bore sight position to produce a first combined data set, wherein the first bore sight position is between the two bore sight positions used to produce the first combined data set; and
   comparing the Σ channel data set taken at the first bore sight position with the first combined data set to blank detection of side lobe discretes for the first bore sight position;
   for a second bore sight position of the plurality of different bore sight positions:
   combining the Σ channel data set taken at the first bore sight position within another Σ channel data set from another bore sight position other than the second bore sight position of the plurality of bore sight positions to produce a second combined data set, wherein the second bore sight position is between the combined Σ channel data sets used to produce the second combined data set; and
   comparing the Σ channel data set taken at the second bore sight position with the second combined data set to blank detection of side lobe discretes for the second bore sight position.

* * * * *

UNITED STATES PATENT AND TRADEMARK OFFICE
CERTIFICATE OF CORRECTION

PATENT NO. : 10,422,855 B2  
APPLICATION NO. : 14/782178  
DATED : September 24, 2019  
INVENTOR(S) : Paul Edwin Holbourn Page 1 of 1

It is certified that error appears in the above-identified patent and that said Letters Patent is hereby corrected as shown below:

On the Title Page

Item (73) Assignee:
Change "LEONARD MW LTD." to -- LEONARDO MW LTD. --

Signed and Sealed this  
Nineteenth Day of November, 2019

Andrei Iancu  
*Director of the United States Patent and Trademark Office*